(12) United States Patent
Brace

(10) Patent No.: US 6,808,185 B1
(45) Date of Patent: Oct. 26, 2004

(54) GARDEN TOOL CADDY AND DOLLY COMBINATION

(76) Inventor: Jeffrey D. Brace, R R 2, Box 2340, Seligman, MO (US) 65745

( * ) Notice: Subject to any disclaimer, the term of this patent is extended or adjusted under 35 U.S.C. 154(b) by 0 days.

(21) Appl. No.: 10/347,549

(22) Filed: Jan. 21, 2003

(51) Int. Cl.⁷ ................................................ B62B 1/12
(52) U.S. Cl. .................................. 280/47.19; 280/47.27
(58) Field of Search .......................... 280/47.17, 47.18, 280/47.19, 47.23, 47.24, 47.35, 79.3, 47.27; 56/400.04; 294/51

(56) References Cited

U.S. PATENT DOCUMENTS

| | | | |
|---|---|---|---|
| 2,262,298 A | * 11/1941 | Procter .................... | 280/47.19 |
| 2,319,992 A | * 5/1943 | Hubbard .................... | 294/19.1 |
| 2,539,336 A | * 1/1951 | Sobers .................... | 280/47.19 |
| 2,623,642 A | * 12/1952 | Theodore .................... | 211/65 |
| 2,957,700 A | * 10/1960 | Beaurline ................ | 280/47.19 |
| 3,116,936 A | * 1/1964 | Magarian ................ | 280/47.19 |
| 3,145,031 A | * 8/1964 | Carl ........................ | 280/47.35 |
| 3,759,538 A | * 9/1973 | Fabiano .................. | 280/47.35 |
| 3,894,748 A | 7/1975 | Ratcliff | |
| 4,114,927 A | * 9/1978 | Butcher ......................... | 285/7 |
| 4,134,605 A | * 1/1979 | Guhne et al. .................. | 285/7 |
| 4,350,366 A | 9/1982 | Helms | |
| 4,923,202 A | * 5/1990 | Breveglieri et al. ...... | 280/47.35 |
| 5,106,112 A | * 4/1992 | Sargent ........................ | 280/40 |
| D338,306 S | * 8/1993 | White et al. ............. | 280/47.35 |
| 5,318,315 A | * 6/1994 | White et al. ............. | 280/47.26 |
| 5,333,885 A | * 8/1994 | Pullman .................. | 280/47.19 |
| 5,380,033 A | * 1/1995 | Harling ..................... | 280/654 |
| 5,390,944 A | * 2/1995 | Sherwin .................. | 280/47.35 |
| 5,687,979 A | * 11/1997 | Plevka ..................... | 280/47.19 |
| 5,704,496 A | * 1/1998 | Latta .......................... | 211/70.6 |
| 5,799,996 A | * 9/1998 | Fredrickson .................. | 294/51 |
| 5,833,250 A | 11/1998 | Schier et al. | |
| 5,957,352 A | * 9/1999 | Gares ......................... | 224/401 |
| 5,971,653 A | * 10/1999 | Harpell ........................ | 403/97 |
| 6,260,865 B1 | * 7/2001 | Yacobi et al. ............. | 280/47.34 |
| 6,332,635 B1 | * 12/2001 | Harpell ...................... | 294/53.5 |
| 6,450,557 B1 | * 9/2002 | Martinez .................... | 294/19.1 |
| 6,666,465 B2 | * 12/2003 | Chan ........................ | 280/47.26 |
| 2004/0061298 A1 | * 4/2004 | Sandoval ................. | 280/47.27 |

* cited by examiner

Primary Examiner—Christopher P. Ellis
Assistant Examiner—Jeff Restifo

(57) ABSTRACT

A garden tool caddy and dolly combination includes a dolly including a generally planar frame has an upper end and a lower end. A pair of wheels is rotatably mounted to the lower end. A platform is attached to and extends away from the lower end. The platform lies in a plane orientated generally perpendicular to a plane of the frame. A plurality of brackets is attached to the frame. At least one elongated tool is selectively attached to the frame by the brackets.

4 Claims, 2 Drawing Sheets

GARDEN TOOL CADDY AND DOLLY COMBINATION

BACKGROUND OF THE INVENTION

1. Field of the Invention

The present invention relates to tool carts and more particularly pertains to a new tool cart for providing a user with a dolly-like apparatus that would contain a kit interchangeable tools.

2. Description of the Prior Art

The use of tool carts is known in the prior art. U.S. Pat. No. 5,833,250 describes a garden cart for carting around a variety of garden tools to a desired location. Another type of tool cart is U.S. Pat. No. 4,350,366 describes a manually propelled lawn and garden cart. U.S. Pat. No. 3,894,748 describes a lawn and garden cart for transporting and storing garden implements having extended thin handles and head portions.

While these devices fulfill their respective, particular objectives and requirements, the need remains for a device that is more compact, and easier to transport, capable of lifting heavier materials and stores more tool articles than previous lawn and garden carts.

SUMMARY OF THE INVENTION

The present invention meets the needs presented above by incorporating a dolly and a cart for mounting a plurality of tool handles with interchangeable tool heads to the frame of the dolly.

Another object of the present invention is to provide a new tool cart that would limit the number of long-handled tools that needed to be carried to a work site and then used during lawn and garden projects.

Still another object of the present invention is to provide a new tool cart that would be convenient while saving the user time and money.

To this end, the present invention generally comprises a dolly including a generally planar frame has an upper end and a lower end. A pair of wheels is rotatably mounted to the lower end. A platform is attached to and extends away from the lower end. The platform lies in a plane orientated generally perpendicular to a plane of the frame. A plurality of brackets is attached to the frame. At least one elongated tool is selectively attached to the frame by the brackets.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
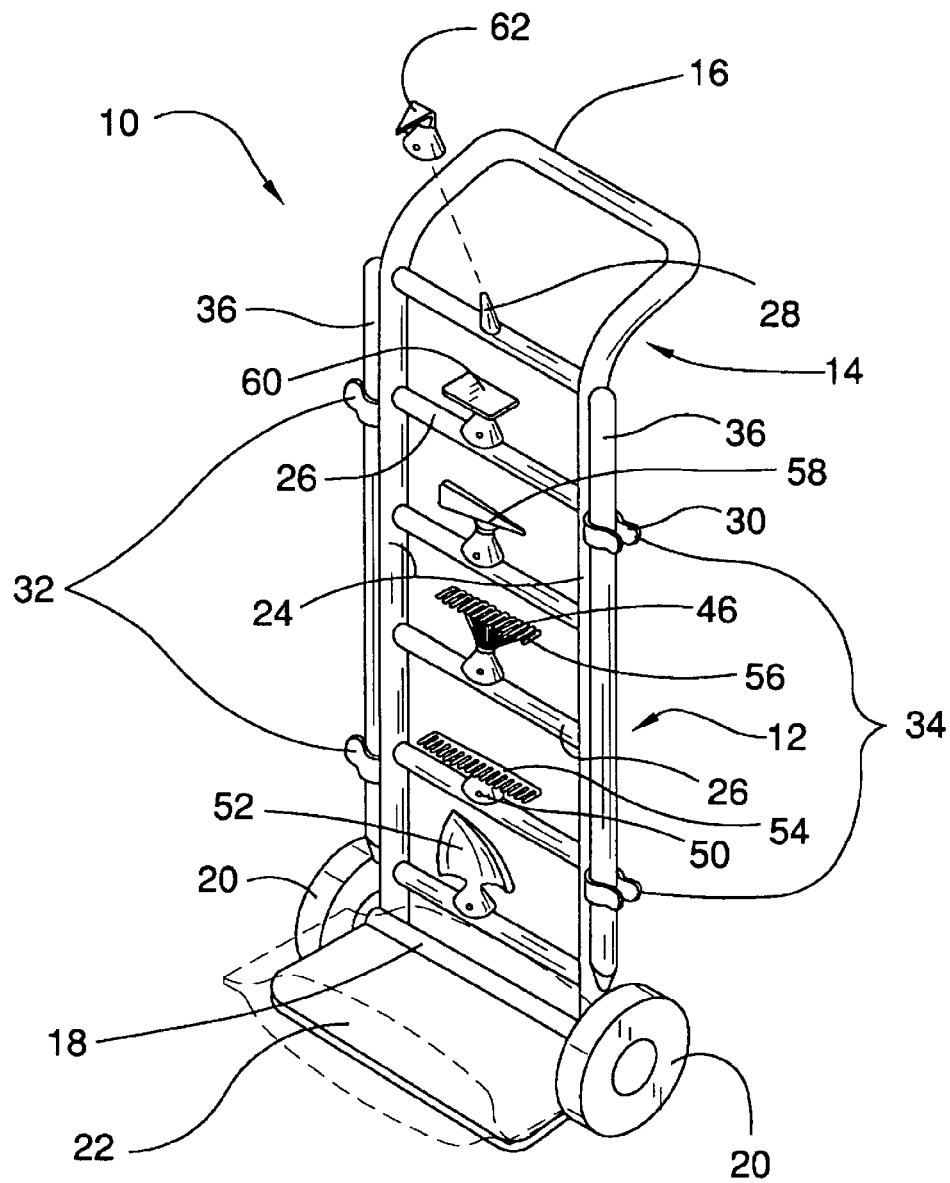
FIG. 1 is a perspective view of a garden tool caddy and dolly combination according to the present invention.
Figure 3:
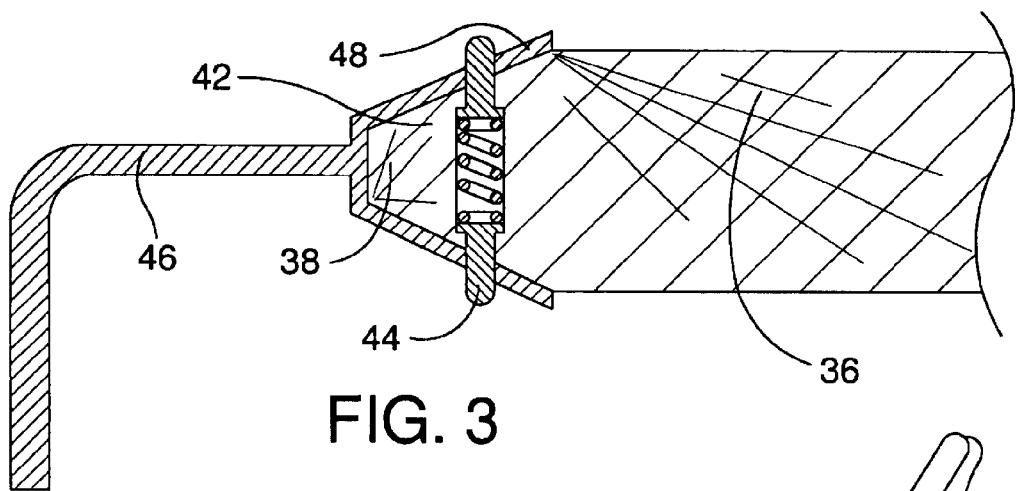
FIG. 3 is a perspective view of the tool handle and tool head present invention.
Figure 2:
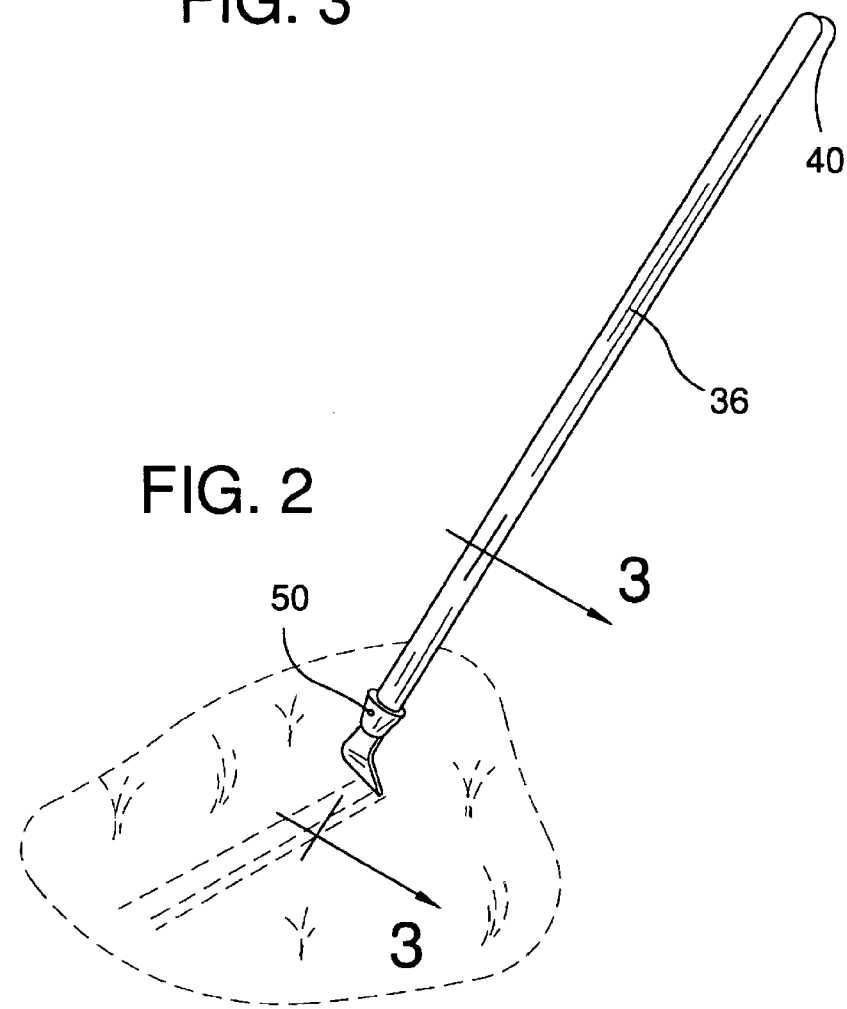
FIG. 2 is a cross-sectional view of the tool handle of the present invention.

With reference now to the drawings, and in particular to FIGS. 1 through 3 thereof, a new tool cart embodying the principles and concepts of the present invention and generally designated by the reference numeral 10 will be described.

As best illustrated in FIGS. 1 through 3, the garden tool caddy and dolly combination 10 generally comprises a dolly 12 including a generally planar frame 14 having an upper end 16 and a lower end 18. A pair of wheels 20 is rotatably mounted to the lower end 18. A platform 22 is attached to and extends away from the lower end 18. The platform 22 lies in a plane orientated generally perpendicular to a plane of the frame 14. The frame 14 includes a pair of vertical and spaced elongated members 24 extending between the upper 16 and lowers 24 ends. A plurality of horizontally orientated rods 26 extends between and is attached to the elongated members 24. Each of a plurality of mountings 28 is attached to one of the rods 26. Each of the mountings 28 extends upwardly from a corresponding one of the rods 26. Preferably, the frame 14 has a bend therein positioned nearer the upper end 16 than the lower end 18 for providing additional leverage.

A plurality of brackets 30 is attached to the frame 14. A first set of brackets 32 and a second set of brackets 34 are defined wherein the brackets 30 of the first set are aligned with each other and the brackets 30 of the second set are aligned with each other. Each of the elongated members 24 has one of the first 32 and second 34 sets of brackets positioned thereon.

At least one elongated tool handle 36 has a first end 38 and a second end 40. The first end 38 includes a male coupler 42 attached thereto. The male coupler 42 includes a pair of pins 44 mounted therein and biased outwardly therefrom. The elongated tool handle 36 is selectively attached to the frame 14 by the brackets 30. Ideally, the at least one elongated tool handle 36 includes a pair of elongated tool handles 36. Each of the elongated tool handles 36 is selectively attached to the frame 14 by one of the first 32 and second 34 sets of the brackets.

Each of a plurality of tool heads 46 includes a female coupler 48 for releasably coupling to the male coupler 42. The tool heads 46 are selectively positionable on one of the mountings 28 for storage purposes. The female coupler 48 preferably includes openings 50 for receiving the pins 44 from the male coupler 42. The plurality of tool heads 46 includes a shovel 52, a rock rake 54, a leaf rake 56, a pick 58, a hoe 60 and a row maker 62, though any tool head 46 may be included.

In use, the dolly 12 is used as a conventional dolly 12 for transporting heaving loads. The brackets 30 hold tool handles 36 that may or may not have tool heads 46 fixedly coupled thereto. For embodiments not having tool handles 36 with fixed tool heads 46, the tool heads 46 are stored on the mountings 28 and attached to the male coupler 42 of the handle 36 as needed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dolly and tool holding combination device comprising:
   a dolly including a generally planar frame having an upper end and a lower end, a pair of wheels being rotatably mounted to said lower end, a platform being attached to and extending away from said lower end, said platform lying in a plane orientated generally perpendicular to a plane of said frame, said frame including a pair of vertical and spaced elongated members extending between said upper and lower ends, a plurality of horizontally orientated rods extending between and being attached to said elongated members, said plurality of rods including an upper rod positioned generally adjacent to said upper end, a lower rod positioned generally adjacent to said lower end, and a plurality of intermediate rods being positioned between said upper rod and said lower rod, a plurality of mountings, each of said mountings being attached to one of said rods, each of said mountings extending upwardly from a corresponding one of said rods;
   a plurality of brackets being attached to said frame, said brackets being positioned outside of said frame with respect to said rods;
   at least one elongated tool handle having a first end and a second end, said first end including a male coupler attached thereto, wherein said elongated tool handle is selectively attached to said frame by said brackets;
   a plurality of tool heads, each of said tool heads including a female coupler for releasably coupling to said male coupler, each of said tool heads being selectively positionable on one of said mountings, said plurality of tool heads being selected from the group consisting of a shovel, a rock rake, a leaf rake, a pick, a hoe and a row maker.

2. The combination device according to claim 1, wherein said plurality of intermediate rods including four intermediate rods.

3. The combination device according to claim 2, wherein a first set of brackets and a second set of brackets are defined wherein said brackets of said first set are aligned with each other and said brackets of said second set are aligned with each other, said first and second set of brackets extending in opposite directions with respect to each other, wherein each of said elongated members has one of said first and second sets of brackets positioned thereon, said at least one elongated tool handle including a pair of elongated tool handles, wherein each of said elongated tool handles is selectively attached to said frame by one of said first and second sets of said brackets.

4. A dolly and tool holding combination device comprising:
   a dolly including a generally planar frame having an upper end and a lower end, a pair of wheels being rotatably mounted to said lower end, a platform being attached to and extending away from said lower end, said platform lying in a plane orientated generally perpendicular to a plane of said frame, said frame including a pair of vertical and spaced elongated members extending between said upper and lower ends, a plurality of horizontally orientated rods extending between and being attached to said elongated members, said plurality of rods including an upper rod positioned generally adjacent to said upper end, a lower rod positioned generally adjacent to said lower end, and a plurality of intermediate rods being positioned between said upper rod and said lower rod, said plurality of intermediate rods including four intermediate rods, said rods being spaced generally equidistant from each other, a plurality of mountings, each of said mountings being attached to one of said rods, each of said mountings extending upwardly from a corresponding one of said rods;
   a plurality of brackets being attached to said frame, a first set of brackets and a second set of brackets being defined wherein said brackets of said first set are aligned with each other and said brackets of said second set are aligned with each other, wherein each of said elongated members has one of said first and second sets of brackets positioned thereon;
   at least one elongated tool handle having a first end and a second end, said first end including a male coupler attached thereto, wherein said elongated tool handle is selectively attached to said frame by said brackets, said at least one elongated tool handle including a pair of elongated tool handles, wherein each of said elongated tool handles is selectively attached to said frame by one of said first and second sets of said brackets;
   a plurality of tool heads, each of said tool heads including a female coupler for releasably coupling to said male coupler, each of said tool heads being selectively positionable on one of said mountings, said plurality of tool heads being selected from the group consisting of a shovel, a rock rake, a leaf rake, a pick, a hoe and a row maker.

* * * * *